June 3, 1958   T. LINDSTROM ET AL   2,837,664
SAFETY CIRCUITS FOR ELECTRO-MECHANICAL BRAKING
Filed May 15, 1957   2 Sheets-Sheet 1

INVENTORS
TURE LINDSTROM
ALEXANDER S. NAGY

BY
ATTORNEYS

June 3, 1958  T. LINDSTROM ET AL  2,837,664
SAFETY CIRCUITS FOR ELECTRO-MECHANICAL BRAKING
Filed May 15, 1957  2 Sheets-Sheet 2

INVENTORS
TURE LINDSTROM
ALEXANDER S. NAGY
BY
R. J. Tompkins
ATTORNEYS

United States Patent Office 2,837,664
Patented June 3, 1958

2,837,664

SAFETY CIRCUITS FOR ELECTRO-MECHANICAL BRAKING

Ture Lindstrom, Glen Burnie, and Alexander S. Nagy, Linthicum, Md., assignors, by mesne assignments, to the United States of America as represented by the Secretary of the Navy Application May 15, 1957, Serial No. 659,444

4 Claims. (Cl. 307—116)

The present invention relates to safety circuits for electro-mechanical braking and more particularly to safety circuits for electro-mechanical braking wherein brake engagement is prevented while the moving member is in operation.

In certain known installations brakes are used for locking a moveable member in a particular position, such as to lock a gun turret in stow position. These installations use an electromagnetically operated brake to lock the moveable member, but fail to provide a system which will insure against brake engagement while the moveable member is in motion. Thus, where the moveable member is a gun turret on an aircraft, an operator may accidentally close the brake circuit with consequent prevention of the guns from following the target and damage to the brake dogs where that type of brake is used. Also, shock waves and vibrations caused by gun fire may accidentally close the brake circuit.

Therefore, an object of the present invention is the provision of a novel circuit which provides positive prevention of accidental brake operation.

Another object is to provide a safety circuit for gun turrets which will prevent the accidental operation of the brake engaging circuits while the turret is in operation.

Other objects and many of the attendant advantages of this invention will be readily appreciated as the same becomes better understood by reference to the following detailed description when considered in connection with the accompanying drawings wherein:

Figs. 1 to 6 are schematic diagrams of a circuit according to the invention showing the sequential operation thereof.

Figure 1:
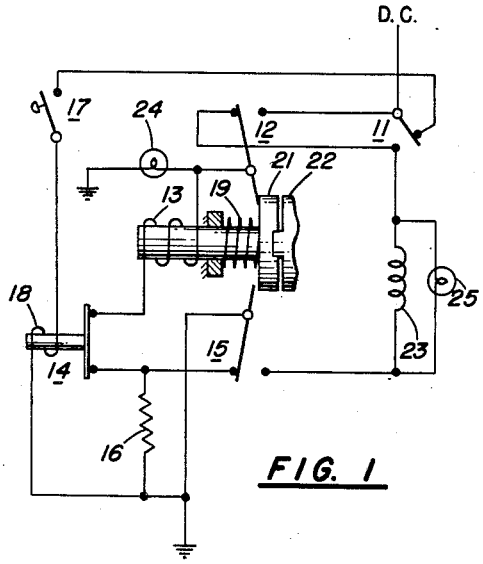

Referring now to the drawings, wherein like reference characters designate like or corresponding elements throughout the several views, there is shown in Fig. 1 a brake disengaging circuit comprising toggle switch 11, subminiature switch 12, brake solenoid winding 13, normally closed relay switch 14, subminiature switch 15 and resistor 16; and a brake engaging circuit comprising toggle switch 11, normally open push button switch 17, and relay winding 18. When winding 13 is de-energized, spring 19 forces the brake member 21 into engagement with brake member 22. Winding 23 operates a hydraulic valve, not shown, which controls the operation of the gun turret. Pilot lights 24 and 25 are connected in parallel with windings 13 and 23 respectively to indicate when these windings are energized.

Figure 2:
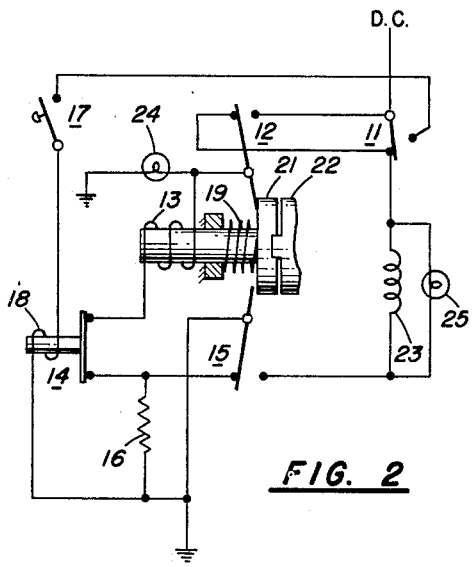
Figure 3:
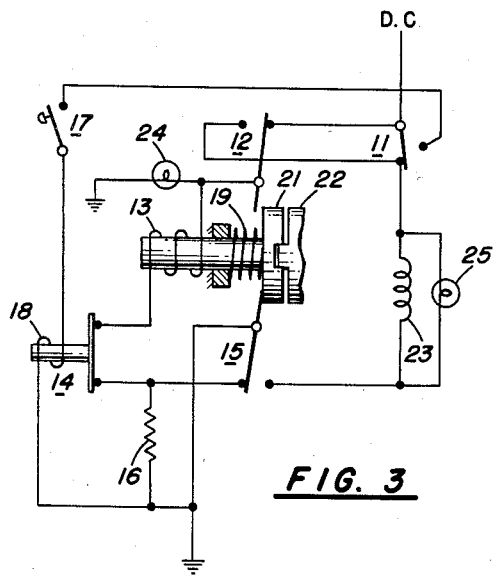
Figure 4:
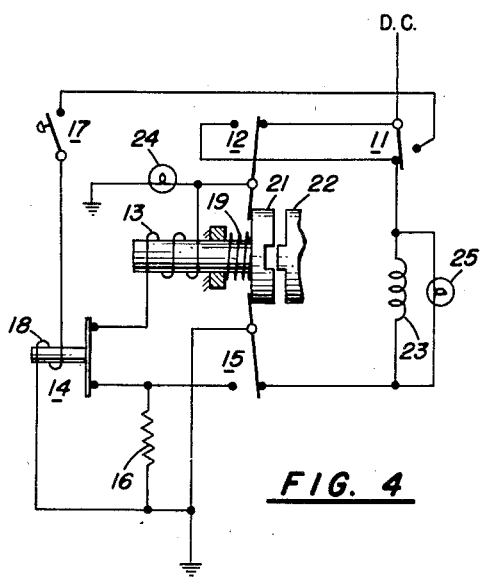

In describing the operation of the circuit, reference will be made to all of the figures since the operation will be described as a sequence. Fig. 1 shows the brake members 21 and 22 in engagement with windings 13 and 23 de-energized. The turret is then in its stow position. Referring now to Figure 2, toggle switch 11 is manually switched to its alternate position as shown. A circuit is then completed from a direct voltage source, not shown, through switches 11, 12, relay winding 13, switches 14, 15, and back to the power source through ground. A circuit is also completed through pilot light 24 to ground. Since winding 13 has a relatively low value of impedance, a large surge of current flows therethrough providing the initial magnetic force to separate clutch members 21 and 22. With this slight movement of member 21, miniature switch 12 is caused to move to the position shown in Fig. 3, thus allowing another surge of current to flow through winding 13 providing sufficient magnetic pull to completely dis-engage brake members 21 and 22. This is shown in Fig. 4. Also with this last movement of member 21 miniature switch 15 is moved to its alternate position, as shown in Fig. 4 thus providing a circuit for energizing winding 23. Resistor 16 in the circuit of winding 13 allows just enough current flow to hold the brake dis-engaged. The turret is now in operation.

Figure 5:
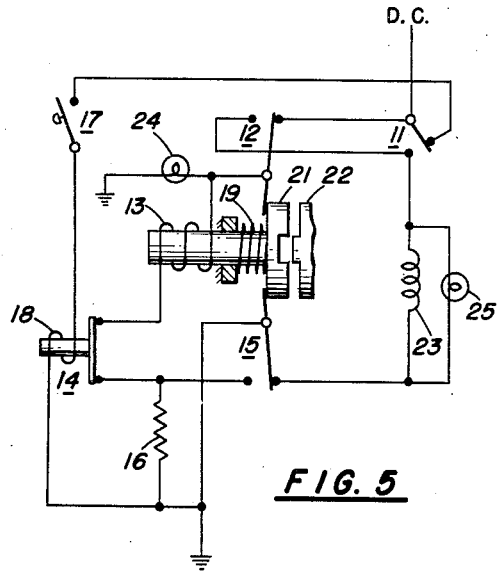
Figure 6:
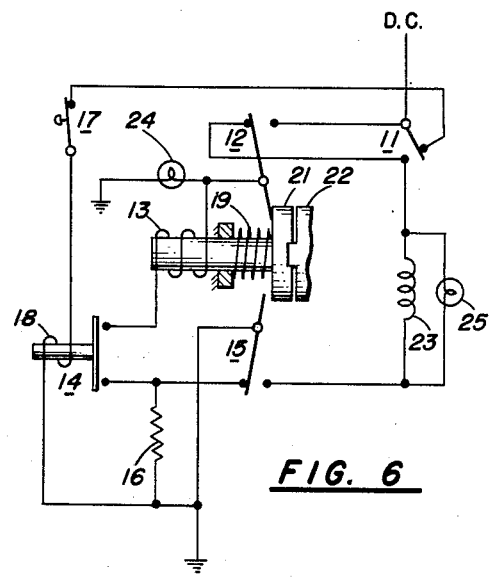

Push button switch 17 may now be closed accidentally or otherwise, but since no current can flow in the brake engaging circuit with the toggle switch 11 in the position shown, the closing of switch 17 will have no effect. Now assume the turret is to be de-energized and stowed, toggle switch 11 is returned manually to its original position, as shown in Fig. 5. This de-energizes winding 23, but winding 13 is still energized. The next and final step is to close switch 17 (see Fig. 6), thus energizing winding 18 of relay switch 14. The circuit including winding 13 is broken, therefore, the force of spring 19 will again engage brake members 21 and 22 as shown in Fig. 6.

Obviously many modifications and variations of the present invention are possible in the light of the above teachings. It is therefore to be understood that within the scope of the appended claims the invention may be practiced otherwise than as specifically described.

What we claim as our invention is:

1. A brake control circuit for a gun turret comprising first and second brake elements, means yieldingly urging said elements into engagement, electro-magnetic actuating means for separating said elements, brake engaging circuit means, a turret control circuit for controlling the operation of said turret, means for causing a first surge of current to flow through said electro-magnetic actuating means to provide an initial separation of said brake elements, means responsive to said initial separation for causing a second surge of current to flow through said electro-magnetic actuating means to completely separate said brake elements, means responsive to said complete separation of said brake elements for energizing said turret control circuit, switch means for de-energizing said turret control circuit and means operable thereafter for breaking the circuit including said electro-magnetic means, whereby said brake will only be engaged when said turret control circuit is de-energized.

2. A brake control circuit for a gun turret comprising first and second brake elements, means yieldingly urging said elements into engagement, electro-magnetic actuating means for separating said elements, first control circuit means including a first switch having two positions, a second switch having two positions, said actuating means, a normally closed relay switch having an actuating winding and a third switch having two positions connected in series across a voltage source when said first, second and third switches are in a first position; means connecting a turret control circuit means in series with said first and third switches across said voltage source when said first switch is in said first position and said third switch is in a second position; second control circuit means including a normally open switch and the relay actuating winding in series across the voltage source when said first switch is in a second position; whereby said normally closed relay can be actuated only when said turret control circuit is de-energized.

3. A protective system for gun turrets for preventing brake engagement while the turret is in operation comprising first and second brake elements, means yieldingly urging said elements into engagement, electro-magnetic actuating means for separating said elements, first control circuit means including a first switch having two positions, said actuating means and a normally closed relay switch connected in series across a voltage source while said first switch is in a first position, turret control circuit means having said first switch and a first normally opened switch connected in series therewith across said voltage source, a safety circuit for de-energizing said first control ciruit including said first switch, a second normally opened switch, and an actuating winding for said normally closed relay switch connected in series across said voltage source, said first normally opened switch being responsive to movement of said brake elements upon separation thereof to connect said turret control circuit means to said voltage source while said first switch is in said first position, said safety circuit being connected to said voltage source while said first switch is in a second position whereby said brake elements can only be engaged while said turret control circuit is de-energized.

4. A protective system for gun turrets comprising an electro-mechanical brake having first and second brake elements; a brake disengaging circuit including a first switch having first and second fixed contacts and a moveable contact, a second switch in juxtaposition to one of said brake elements and having first and second fixed contacts and a moveable contact, a solenoid winding for actuating one of said brake elements, a normally closed relay switch having an actuating winding, and a third switch in juxtaposition to said one of said brake elements having first and second fixed contacts and a moveable contact, means connecting said moveable contact of said first switch to a source of voltage and to said first fixed contact of said second switch, means connecting said moveable contact of said second switch to one side of said solenoid winding, means connecting the other side of said solenoid winding in series with said normally closed relay to said first fixed contact of said third switch, means connecting the moveable contact of said third switch to ground; a brake engaging circuit comprising a normally open switch and the actuating winding of said normally closed relay switch connected in series between said first fixed contact of said first switch and ground; a turret control circuit connected in series between said second fixed contact of said first switch and said second fixed contact of said third switch; said second fixed contact of said second switch being connected to said second fixed contact of said first switch; a current limiting resistor connected between said first contact of said third switch and ground; means urging said brake elements in engagement when said brake disengaging circuit is de-energized, whereby when said brake elements are separated said turret control circuit is energized and when said moveable contact of said first switch is moved to contact said second fixed contact said brake engaging circuit is energized and said turret control circuit is de-energized.

No references cited.